Figure 1:
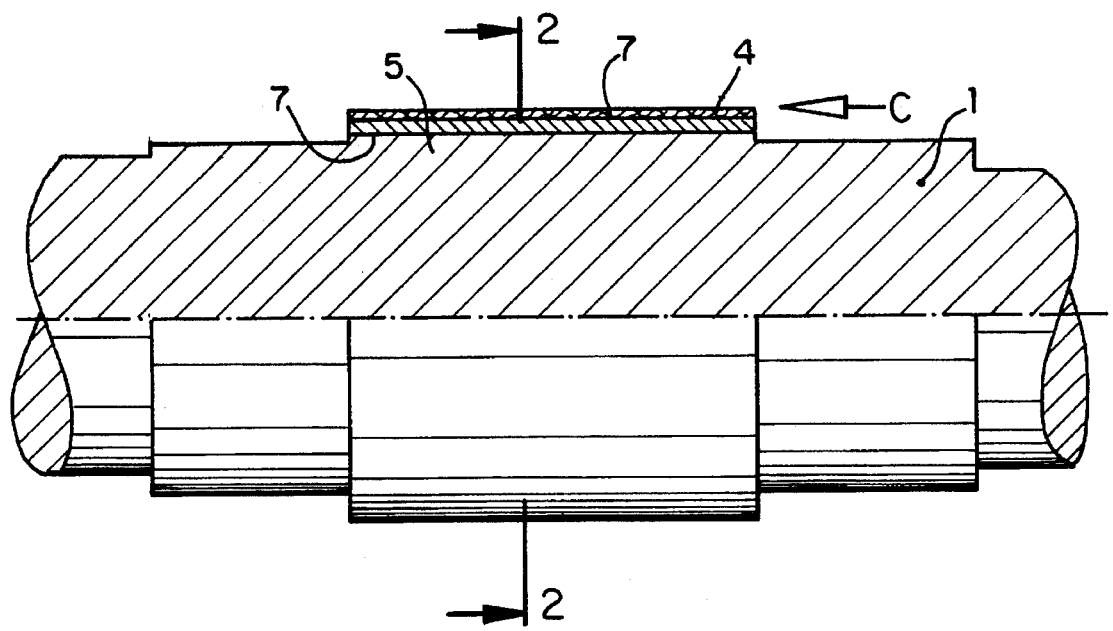

United States Patent
Canders et al.

[11] Patent Number: 5,485,045
[45] Date of Patent: Jan. 16, 1996

[54] ROTOR FOR PERMANENT MAGNET-EXCITED, HIGH-SPEED ELECTRIC MACHINES AND ELECTRIC MACHINE EQUIPPED WITH THIS ROTOR

[75] Inventors: Wolf-Ruediger Canders; Joachim Heldt; Norbert Zellmann, all of Osterode am Harz, Germany

[73] Assignee: Anton Piller GmbH & Co. KG, Osterode am Harz, Germany

[21] Appl. No.: 995,387

[22] Filed: Dec. 18, 1992

[30] Foreign Application Priority Data

Dec. 20, 1991 [DE] Germany ............................ 41 42 461.1

[51] Int. Cl.⁶ .................................................. H02K 21/12
[52] U.S. Cl. .............................. 310/156; 310/42; 310/43; 310/262; 310/271; 29/598
[58] Field of Search ............................... 310/156, 171, 310/261, 42, 44, 43, 262, 271; 29/598

[56] References Cited

U.S. PATENT DOCUMENTS

| | | | |
|---|---|---|---|
| 3,169,203 | 2/1965 | Lavin | 310/156 X |
| 4,219,752 | 8/1980 | Katou | 310/156 |
| 4,486,678 | 12/1984 | Olson | 310/156 X |
| 4,633,113 | 12/1986 | Patel | 310/156 X |
| 4,713,569 | 12/1987 | Schwartz | 310/156 X |
| 4,748,359 | 5/1988 | Yahara | 310/156 X |
| 4,910,861 | 3/1990 | Dohogne | 310/43 |
| 5,162,682 | 11/1992 | Yamaguchi | 310/156 X |
| 5,170,085 | 12/1992 | Shinto | 310/156 |
| 5,175,461 | 12/1992 | Zigler | 310/156 X |

FOREIGN PATENT DOCUMENTS

| | | |
|---|---|---|
| 3224904 | 11/1986 | Germany . |
| 3943237 | 6/1991 | Germany . |

*Primary Examiner*—R. Skudy
*Attorney, Agent, or Firm*—John F. A. Earley; John F. A. Earley, III

[57] ABSTRACT

The present invention pertains to a rotor for permanent magnet-excited electric machines, on the circumferential surface of which permanent magnets are arranged, and fillers made of a nonmagnetic material are arranged between them [the permanent magnets], wherein the surface of the permanent magnets and fillers on the whole are made slightly conical and are covered by a separately manufactured binding under prestress.

15 Claims, 1 Drawing Sheet

ROTOR FOR PERMANENT MAGNET-EXCITED, HIGH-SPEED ELECTRIC MACHINES AND ELECTRIC MACHINE EQUIPPED WITH THIS ROTOR

The present invention pertains to a rotor for permanent magnet-excited, high-speed electric machines and to an electric machine equipped with this rotor.

"High speed" is defined as speeds exceeding 18,000 rpm, especially speeds between 18,000 and 120,000 rpm.

As is apparent from DE 39 43 237 A1, a rotor for the said applications with the following characteristics has been known:

Permanent magnets with filler pieces made of a nonmagnetic material and arranged between them are arranged circumferentially on a partial section of the rotor shaft, the permanent magnets and the fillers extend in the axial direction of the rotor shaft and are circumferentially surrounded by a prestressed binding made of a high-strength material.

The rotor is assembled such that the binding is located in the air gap of the electric machine.

Balance errors due to asymmetric radial displacements of the permanent magnets at higher circumferential velocities cannot always be avoided with certainty, especially in the case of high-speed, permanent magnet-excited electric machines, whose permanent magnets on the rotor barrel are held by a binding, because the composite of plastic binding and the permanent magnets expands more greatly under the effect of the centrifugal forces than does the rotor barrel. As a result, a gap develops between the permanent magnet and the rotor barrel, which may lead to variable balance errors.

To avoid these disadvantages, DE 39 43 237 A1 suggests that the outer surface of the rotor barrel (of the rotor shaft) facing the binding be divided by a plurality of recesses, so that tangential stresses will be avoided there to the extent possible during expansion under the effect of centrifugal force.

Another way of solving the said problem is disclosed in DE 32 24 904 C2. Since high-residual permanent magnets cannot be used as load-bearing materials because of their inner texture, but are sensitive to impact loads and tensile stresses, the permanent magnets used to excite the prior-art electric machine and the fillers made of nonmagnetic material for the pole gaps on the rotor barrel (rotor shaft) of the rotor are held together by a binding made of fiber-reinforced, especially carbon fiber-reinforced plastic (CFP) under prestress, and the prestress of the jacket and of the binding respectively is applied by a wedging and conical fillers, respectively.

The technique according to DE 32 24 904 C2 is also relatively complicated (large number of fits to be prepared accurately and inhomogeneities in stress distribution over the circumference), so that the basic task of the present invention is to provide a rotor for high-speed, permanent magnet-excited electric machines, which has a simple design and functions reliably even at high speeds of the electric machine.

The present invention is based on the discovery that this goal can be achieved in a surprisingly simple manner by making the surface of the rotor shaft in the area of the permanent magnets and fillers slightly conical circumferentially and by pushing a binding as a prefabricated component with a corresponding inner cone onto the rotor shaft assembled with the permanent magnets and fillers by axial displacement, wherein prestress of the binding against the rotor shaft is also achieved at the same time, and this [prestress] is sufficient for avoiding balance errors due to asymmetric radial displacements of the permanent magnets and fillers at higher circumferential velocities. It was determined that the slight differences in the in induction distribution as a consequence of the conical contour do not appreciably affect the operation and the safety of the electric machine.

One particular advantage of the design according to the present invention is that both an expensive wedging and an (undesired) increase in the thickness of the binding, which is limited by the electric specifications for the maximum dimensions of the air gap between the stator and the rotor of the electric machine, in which the binding is located, are avoided.

Consequently, the present invention pertains, in its most general embodiment, to a rotor for permanent magnet-excited, high-speed electric machines with the following characteristics:

permanent magnets with fillers made of nonmagnetic material arranged between them are arranged circumferentially on a partial section of the rotor shaft, the permanent magnets and the fillers extend in the axial direction of the rotor shaft, and are circumferentially surrounded by a prestressed binding made of a high-strength material, wherein the common circumferential surface of permanent magnets and fillers is made slightly conical when viewed in the axial direction of the rotor shaft, and the binding as a prefabricated component with a corresponding inner cone has been pushed onto the rotor shaft assembled with the permanent magnets and fillers by direct axial displacement, and a prestress of the binding relative to the rotor shaft and its permanent magnets and fillers is applied at the same time.

The assembly of the rotor shaft will be explained in greater detail below on the basis of an exemplary embodiment, whose characteristics are generally valid in this respect.

According to an advantageous embodiment, the rotor shaft is designed with a polygonal cross-sectional area in the area of the permanent magnets and fillers, and the permanent magnets and fillers are fastened, e.g., bonded, to the corresponding polygonal surfaces.

It is also advantageous to assemble a plurality of permanent magnets (in groups) on two opposite sections of the rotor shaft, and to arrange the fillers between them, the groups of permanent magnets having different polarity.

Thus, a specific embodiment may be such that the top view of the rotor shaft is a dodecagon, and the permanent magnets are mounted as groups of four next to and opposite each other, so that two nonmagnetic fillers are arranged on the remaining polygonal surfaces between the groups of permanent magnets arranged in groups as north and south poles.

The said embodiments make it possible first to equip the rotor shaft with the individual permanent magnets and fillers, wherein the common circumferential surface is subsequently turned off, forming a slightly conical form when viewed in the direction of the axis of the shaft. The surface can then additionally be polished. The cone angle selected should preferably be markedly smaller than the angle at which automatic interlock develops.

Details will appear from the following description of the figures, which are again generally valid, in this case as well.

The fillers may consist of steel or soft iron elements. A fiber-reinforced plastic is preferably used for the binding, and plastics reinforced with carbon fibers, so-called CFPs, have proved to be suitable.

Since the modulus of elasticity of the binding is markedly lower than the modulus of elasticity of the shaft material and of the magnets/fillers when the said composite materials are used, it cannot be ruled out that the prestress force acting on the rotor will be at least partially eliminated under high centrifugal force load. To prevent this from happening, the present invention suggests that connection areas of the rotor shaft, permanent magnets, and fillers be designed with an elastic bonding 7, in which case elastic filling elements can additionally be inserted into the corresponding bonded joints. The elastic bonding may be made of, e.g., silicone, and the filling elements may be designed as strips and consist of plastic, e.g., aramide. The joint thickness should be at least 0.2 mm.

According to an alternative possibility, the said problems are eliminated by designing the surface of the rotor shaft with a certain roughness. This also leads to an overall increase in the elasticity of the rotor. A roughness value Ra exceeding 12.5 µm (preferably 12.5 to 25 µm) has proved to be particularly advantageous.

Further characteristics of the present invention will become apparent from the characteristics of the subclaims as well as the other application documents, especially the following description of an exemplary embodiment. In the drawing, FIG. 1 shows a shaft section of a rotor with a synchronous machine with corresponding exciting magnets on the shaft surface, wherein the top part of the Figure shows an axial section and the bottom part, a view, and FIG. 2 shows a section along line 2—2 according to FIG. 1.

Figure 2:
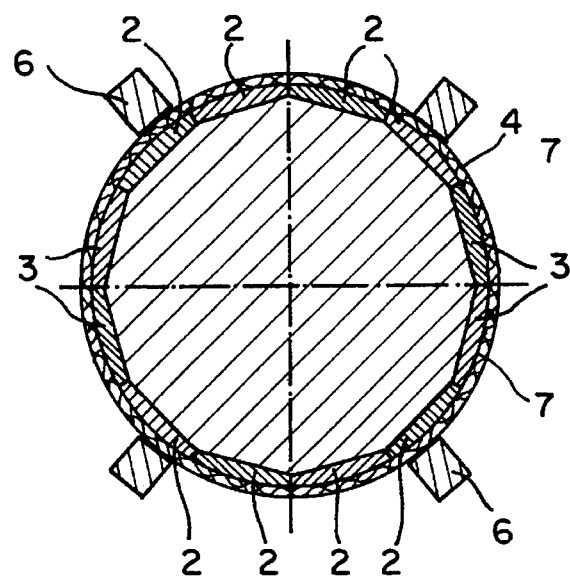

FIG. 1 shows part of a rotor shaft 1 of a synchronous electric machine. As can be recognized, one shaft section 5 has a larger diameter than the adjacent shaft sections. As is shown in FIG. 2, this said section 5 is of polygonal design, in the form of a dodecagon in this case. Permanent magnets 2, located opposite in groups of four, are arranged on the twelve surfaces thus formed, such that the permanent magnet groups 2', 2" form the two magnet poles (north-south). Two soft iron elements 3 each, which separate the said magnet groups 2', 2" from one another, are arranged between the magnet element groups 2', 2" of opposite polarity.

Both the said permanent magnet elements 2 and the said soft iron elements 3 extend in the axial direction of the said rotor shaft 1, and are bonded onto the corresponding polygon surfaces. In preparing and assembling the rotor shaft, the said permanent magnets 2 and said soft iron elements (fillers) 3 are turned off jointly and ground after bonding, as such that—in the axial direction of the rotor shaft—a slight conicity is formed, so that the common surface of the said permanent magnets 2 and said fillers 3 has a slightly conical shape. The conicity is substantially smaller than the angle at which automatic interlocking occurs. A plastic binding 4 containing carbon fibers is subsequently pushed directly over the said permanent magnets 2 and said fillers 3 thus prepared. The said binding 4 was first prepared as follows:

The binding 4 is wound separately on a mandrel with a corresponding, slightly conical surface. The winding is performed such that the binding is essentially cylindrical on the circumferential side. It follows from this that it has a greater thickness in the section with smaller internal diameter than at the other end.

After curing of the resin, with which the carbon fibers are wetted during winding, reinforcing strips 6 are bonded to the binding according to this exemplary embodiment; as is shown in FIG. 2, there are a total of four such strips, and they are arranged distributed uniformly, in the axial direction of the said shaft 1, over the circumference of the said binding 4. The said reinforcing strips 6 may consist of plastic, or of a metal. Using the reinforcing strips, the binding is pressed off the said winding mandrel after it has dried, without appreciably stressing the winding itself. The thickness of the winding can therefore be designed corresponding to the tensile force to be absorbed by it, and thus it can meet the requirement to minimize the air gap.

Using the said reinforcing strips 6, the winding is subsequently pushed over the conically ground surface of the said permanent magnets 2 and said fillers 3 and the rotor shaft. This process is indicated by the arrow C in FIG. 1. At the same time, a corresponding prestress is achieved between the said binding 4 and the said rotor shaft 1, as well as the said permanent magnets 2 and said fillers 3 arranged thereon.

The said reinforcing strips 6 are subsequently removed. If a thermoplastic adhesive is used (for the application of the said reinforcing strips 6), heating of the reinforcing strips is sufficient for this purpose in order to subsequently remove it (due to the corresponding plasticity of the adhesive). However, they may also be turned off.

The prestress between the binding and the rotor shaft can be adjusted to the actually desired value by [selecting] the internal diameter of the binding. Thus, the prestress can be adjusted as a function of the maximum occurring speed of rotation of the synchronous machine.

Not only can the rotor described be manufactured economically, it also considerably improves the function and the safety of the synchronous machine thus assembled. Besides the possibility of generating a defined prestress, the described application of a separately prefabricated binding, which is subsequently pushed axially over the rotor shaft, has the advantage that the said rotor shaft 1 of the synchronous machine does not need to be placed into a winding device.

Any kind of expensive wedging is also eliminated, and the thickness of the binding is minimized at the same time.

We claim:

1. Rotor for high-speed magnet excited electric machines comprising a rotor shaft;

permanent magnets and fillers arranged between them, said fillers being made of non-magnetic material, said permanent magnets and said fillers being arranged circumferentially on a partial section of said rotor shaft;

said permanent magnets and said fillers extending in axial direction of said rotor shaft;

said permanent magnets and said fillers forming together a common circumferential surface, said circumferential surface being slightly conic when viewed in said axial direction of said rotor shaft;

a prestressed binding made of a high-strength material and surrounding said permanent magnets and said fillers on said circumferential surface, said binding being a prefabricated component made of fiber-reinforced plastic, said fiber-reinforced plastic having fibers being wound to form a sightly conical inner surface of said prefabricated component;

said binding being prestressed relative to said rotor shaft for forcing said permanent magnets and said fillers against said rotor shaft.

2. Rotor in accordance with claim 1, in which said rotor shaft in an area of the permanent magnets and fillers is designed with a polygonal cross-sectional area and said permanent magnets as well as said fillers are attached on surfaces of the shaft corresponding to said cross-sectional area.

3. Rotor in accordance with claim 2, in which the permanent magnets and fillers are bonded onto surfaces of the shaft corresponding to said cross-sectional area.

4. Rotor in accordance with claim 1, in which a plurality of permanent magnets is arranged next to one another on two opposite sections of said rotor shaft forming a group on each section, said fillers being arranged between them, and said groups of permanent magnets have different polarity.

5. Rotor in accordance with claim 2, in which said rotor shaft has a dodecagonal cross section, and the permanent magnets are arranged in groups of four next to one-another, and the fillers are arranged between them.

6. Rotor in accordance with claim 1, in which the fillers consist of steel.

7. Rotor in accordance with claim 1, in which the fillers consist of soft iron elements.

8. Rotor in accordance with claim 1, in which the binding consists of a plastic reinforced with carbon fibers.

9. Rotor in accordance with claim 1, in which the binding is attached to the rotor shaft by means of a bonding agent.

10. Rotor in accordance with claim 1, with axially extending reinforcing strips integrated in the binding.

11. Rotor according to claim 1, in which said binding has an essentially cylindrical circumferential surface.

12. Rotor for high-speed magnet excited electric machines comprising a rotor shaft, permanent magnets and fillers arranged between them, said fillers being made of non-magnetic material, said permanent magnets and said fillers being arranged circumferentially on a partial section of said rotor shaft, said permanent magnets and said fillers extending in axial direction of said rotor shaft and forming together a common circumferential surface, said common circumferential surface being slightly conic when viewed in said axial direction of said rotor shaft;

bonding joints between adjacent surface sections of said permanent magnets, said fillers and said rotor shaft, a bonding agent consisting of an elastic material and being arranged in said bonding joints;

a prestressed binding comprising a high-strength fiber reinforced plastic material and surrounding said permanent magnets and said fillers on said common circumferential surface, said binding having a slightly conical inner surface being supported by said common circumferential surface, said binding being a prefabricated component and being prestressed relative to said rotor shaft for forcing said magnets and said fillers onto said rotor shaft.

13. Rotor according to claim 12, in which surfaces of said rotor shaft bearing said bonding agent are designed with a certain roughness.

14. Rotor in accordance with claim 12, in which elastic fillers are integrated in said bonding joints filled with the bonding agent.

15. Rotor according to claim 12, in which said binding is a prefabricated component which includes a binding fiber that is wound to form said slightly inner conical surface of said prefabricated component.

* * * * *